United States Patent [19]
Kyriakis

[11] Patent Number: 5,528,141
[45] Date of Patent: Jun. 18, 1996

[54] ECCENTRICITY GAUGE FOR A CONDUCTOR INCLUDING TWO INDUCTORS HAVING OPPOSED FIELDS

[75] Inventor: John Kyriakis, London, England

[73] Assignee: Beta Instrument Co. Ltd., Bucks, England

[21] Appl. No.: 202,659

[22] Filed: Feb. 28, 1994

[30] Foreign Application Priority Data

Feb. 26, 1993 [GB] United Kingdom .................. 9303978

[51] Int. Cl.$^6$ .............................. G01B 7/06; G01N 27/72
[52] U.S. Cl. .......................................... 324/230; 324/228
[58] Field of Search ......................... 324/207.14, 207.26, 324/207.15, 207.16, 207.18, 207.19, 207.22, 207.24, 231, 228, 229, 230, 234, 241, 242, 262

[56] References Cited

U.S. PATENT DOCUMENTS

| | | | |
|---|---|---|---|
| 2,779,916 | 1/1957 | Poole | 324/229 |
| 3,001,130 | 9/1961 | McClurg et al. | 324/229 |
| 4,086,044 | 4/1978 | Sikora . | |
| 4,349,780 | 9/1982 | Zuber et al. | 324/229 |
| 4,641,525 | 2/1987 | Merki . | |
| 4,719,420 | 1/1988 | Boimond | 324/207.14 |
| 4,763,071 | 8/1988 | McGee et al. | 324/229 |
| 5,075,622 | 12/1991 | Konii et al. | 324/229 |
| 5,214,376 | 5/1993 | Sikora . | |

FOREIGN PATENT DOCUMENTS

0457316A1  11/1991  European Pat. Off. .

*Primary Examiner*—Sandra L. O'Shea
*Assistant Examiner*—Roger Phillips
*Attorney, Agent, or Firm*—Griffin, Butler, Whisenhunt & Kurtossy

[57] ABSTRACT

The invention relates to method and apparatus for measuring and displaying the eccentricity or off-set position with respect to coaxiality of a metallic conductor within an insulating coating during an extrusion process. The measuring apparatus employs a combination of optical and electrically inductive techniques to determine respectively the position of the outer coating of the cable and that of the core within the cable. By relating these positional measurements it is possible to determine the position of the core relative to a desired location namely the coaxial position so that appropriate corrections can be made to the extrusion process to keep the core in that coaxial position.

4 Claims, 2 Drawing Sheets

Fig.3.A 5,528,141

ECCENTRICITY GAUGE FOR A CONDUCTOR INCLUDING TWO INDUCTORS HAVING OPPOSED FIELDS

FIELD OF THE INVENTION

The present invention relates to the formation of an electrical cable by extrusion techniques and particularly to a method and apparatus for monitoring the position of the conductor core of the cable in relation to the outer extruded coating in order that the extrusion process can be controlled to maintain the core on the central axis of the cable.

BACKGROUND OF THE INVENTION

During tile manufacture of an electrical cable by means of continuous extrusion, an inner conductor wire such as of copper, aluminium, steel or other electrically conductive material is coated with an insulating material of plastics, rubber and the like, the coating being applied as by extrusion from an extruder through which the inner conductor is passed at a predetermined speed.

The finished product coming from the extruder then undergoes a cooling process which cools the hot plastics or rubber coating issuing from the hot extruder whereafter the product is wound onto a drum or reel.

To preserve the electrical and mechanical characteristics of the cable, it is important that the inner conductor is located along the central axis of the cable.

SUMMARY OF THE INVENTION

It is accordingly an object of the present invention to provide a method and apparatus for determining the position of the conductor core of an electrical cable during an extrusion process so as to ensure that it is maintained in a central cable axial position during the process.

According to one aspect of the present invention, there is provided apparatus for determining the position of the conductor core of an electrical cable being formed in an extrusion process comprising optical means for transmitting a beam of light across the cable, detector means for receiving that portion of the transmitted beam not obscured by the cable and providing output signals representative of the position of the outer surface of the cable across a predetermined cross section in the cable run, electrical inductive means positioned to either side of the cable at said predetermined cross section to provide when energised, induced magnetic fields in the vicinity of the cable, means for detecting variation in current in said inductive means in response to movement of the conductor core through said fields corresponding to a change in position of the conductor core from a desired location within the cable thereby to provide a measure of the position of the conductor core at said predetermined cross-section, and means for relating the position of said conductor core to the position of the outer surface of the cable whereby to determine the eccentricity or off-set position of the conductor core with respect to said desired location within the cable.

BRIEF DESCRIPTION OF THE DRAWINGS

The invention will now be described in preferred detail with reference to the accompanying drawings wherein;

FIGS. 3, 3A and 4 illustrate how the eccentricity of the conductor core of the travelling electrical cable may be calculated using the measuring system of the invention in relation to a central position.

PREFERRED EMBODIMENTS OF THE INVENTION

Figure 1:
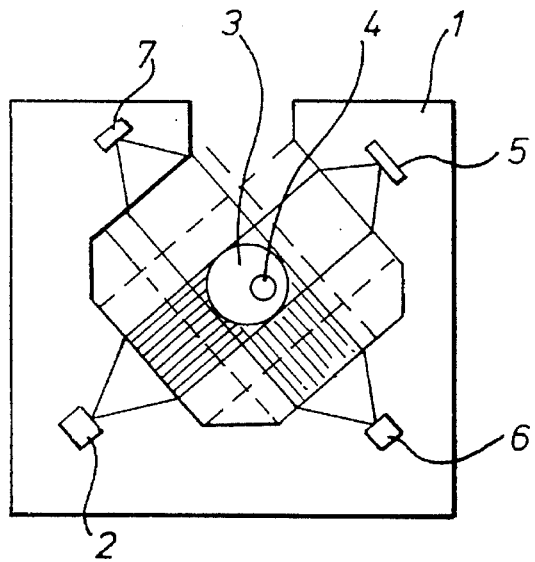
FIG. 1 depicts a measuring system in end view in accordance with an embodiment of the invention.

The measuring system 1 shown in FIG. 1 is designed to determine the eccentricity or off-centre axial position of the core of a moving electrical cable in an extrusion process using optical and electrical measuring techniques.

It comprises a first light source 2 for emitting a beam of light directed at a moving cable 3 provided with a conductor core 4.

Further induction coils 10 and 11 may be positioned on either side of the cable 3, and on the axis corresponding to the axis of the parallel scanning beam emitted by light source 6 and detected by photosensitive detector 7. Magnetic fields induced during passage of current, preferably ac current, through the induction coils 8, 9, 10 and 11 are used to determine the position of the inner core 4 of the cable 3.

Thus, for example, a current $I_1$ passed through coil 8 and a current $I_2$ passed through coil 9 will set up magnetic fields 12 and 13 respectively in opposition to one another and depending on the direction of the current passing through the coils $I_1$ and $I_2$.

The system is designed such that when the conductor 4 is midway between the coils 8 and 9, the current $I_1$ and $I_2$ are equal.

If the conductor core 4 moves away from its position and along the axis between the coils 8 and 9, i.e., along the optical axis between the light source 2 and the detector 5, currents $I_1$ and $I_2$ will change relative to one another.

By measuring this difference it is possible to deduce a change of position of the conductor 4 along the axis of the light beam emitted by light source 2.

A similar movement along the axis of the optical beam emitted by light source 6 can be determined by means of induction coils 10 and 11.

Figure 2:
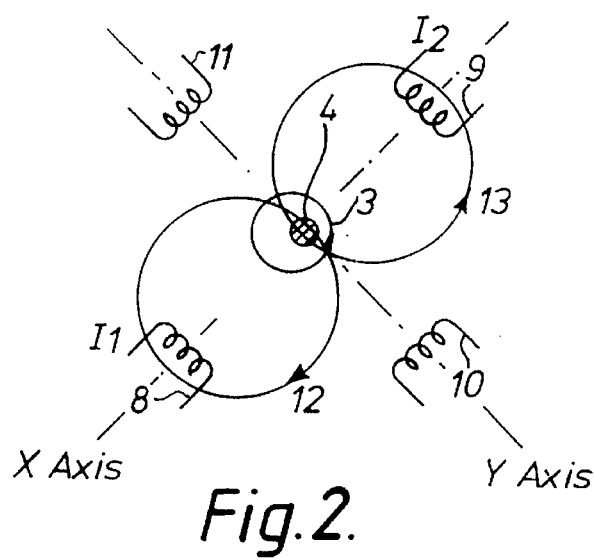
FIG. 2 illustrates how induction coils of the measuring system of FIG. 1 are positioned around the travelling electrical cable.
Figure 3:
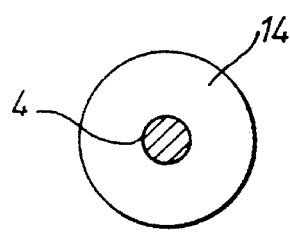
Figure 4:
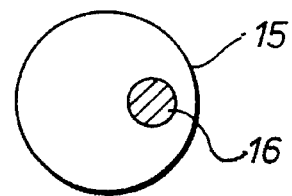
Figure 4:
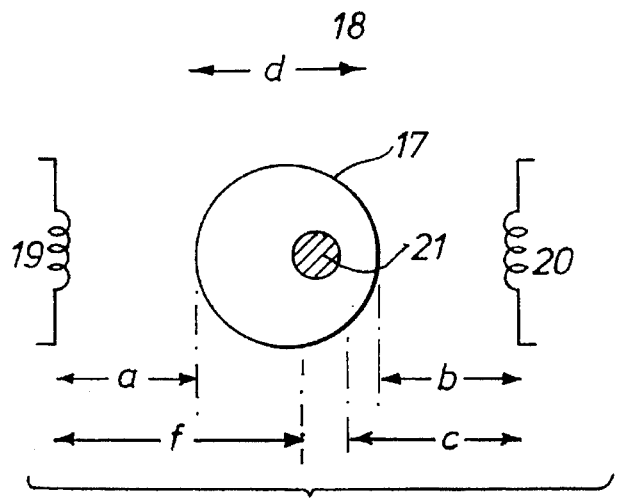

FIGS. 3, 3A and 4 illustrate the way in which the determination of the position of the outer cable by the optical system of FIG. 1 and the determination of the position of the conductor core 4 of the cable 3 by means of the system shown in FIG. 2, is utilised to measure the eccentricity of the cable core 4.

Thus, as illustrated in FIG. 3A, the desired correct position of the conductor core 4 is along the central axis of the cable 14 therein depicted.

The eccentricity of the cable is defined by any position off this central axis as shown in FIG. 3, namely to the position 16 in relation to the outer surface of the cable 15.

With reference to FIG. 4, consider an electrical cable 17 moving in an extrusion process and wherein the inner conductor 21 has moved off-centre.

The position of the outer surface of the electrical cable 17 is determined optically by an optical measurement of distances 'a' and 'b', that is between the induction coil 19 on one side of the cable and induction coil 20 on the other side of the cable and lying on the optical axis of the transmitted light beam, for example, light source 2 shown in FIG. 1.

The position of the inner core 21 of the electrical cable is measured by induction coils 19 and 20 as explained with reference to FIG. 2 and these are differences 'f' and 'c' as shown.

Eccentricity e of the inner core 21 is defined by the equation $$e = \frac{f-a}{c-b}$$

Figure 5:
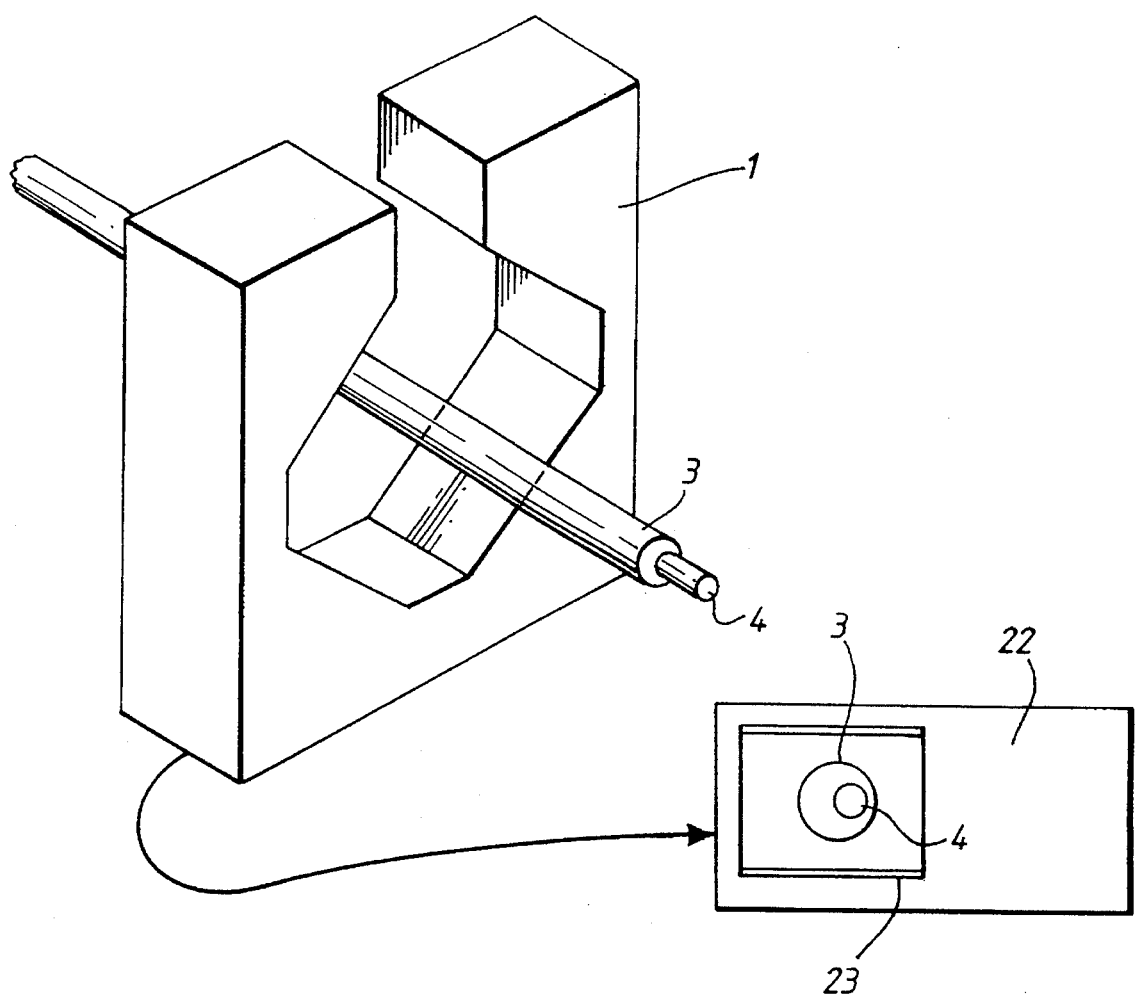
FIG. 5 is a perspective view of generalised illustration of the measuring system as shown in FIG. 1.

The optical and electrical measuring system 1 as described with reference to FIGS. 1 and 2 is shown in perspective view in FIG. 5.

The measurements of the eccentricity of the conductor core 4 of the cable 3 are performed on a continuous basis and processed in an indicator unit 22 provided with a cathode ray tube 23 which is set to display a cross sectional view of the cable 3 with conductor core 4 as shown.

By incorporating a feed back loop, it is possible to control the extrusion process by adjusting the die head through which the cable coating is extruded onto the conductor core 4 and thus correct for the eccentricity of the core within the cable 3.

The invention as described above with reference to a preferred embodiment may be seen in summary to comprise a method and apparatus for measuring and displaying the eccentricity of a metallic conductor within an insulating coating during an extrusion process. The apparatus and method utilise optical means for detecting the position of the outer surface of the travelling cable and inductive means for detecting the position of the conductor cable and, by solving mathematical equations, the amount of eccentricity of the conductor within the plastics or insulating coating may be derived.

The scanning optical technique determines the position of the outer surface of the cable within the optical limits of the apparatus and the inductive technique which uses opposing currents flowing in inductive coils produces a nulling method, by which the position of the electrical conductor within the optical field is determined.

The optical means which determine the position of the outer surface of the cable and the inductive means which determine the inner conductor of the cable may operate in two planes at right angles to each other.

An outer balance signal may be obtained in these two planes for feed back purposes to control cable eccentricity.

I claim:

1. Apparatus for determining the position of a conductor core of an electrical cable being formed in an extrusion process comprising optical means for transmitting a beam of light across the cable, detector means for receiving that portion of the transmitted beam not obscured by the cable and providing output signals representative of the position of the outer surface of the cable across a predetermined cross section in the cable, at least two electrical inductive means positioned on opposite sides of the cable at said predetermined cross section to provide, when energised with energising currents, induced magnetic fields in the vicinity of the cable, means for energising the at least two electrical inductive means for causing the induced magnetic fields in the vicinity of the cable to be in opposition to one another means for detecting variation in said energising currents in said inductive means in response to movement of the conductor core through said fields corresponding to a change in position of the conductor core from a desired location within the cable to provide a measure of the position of the conductor core at said predetermined cross section, and means for relating the position of said conductor core to the position of the outer surface of the cable to thereby determine the eccentricity (offset position) of the conductor core with respect to said desired location within the cable.

2. Apparatus as claimed in claim 1 wherein said means for detecting said variation in said energising currents in said inductive means is adapted to register null detection when the conductor core is at said desired location within the conductor cable.

3. Apparatus as claimed in claim 1 wherein each inductive means comprises an induction coil having an axis substantially normal to the axis of the optical scanning beam, a said coil and optical scanning beam being provided at substantially 90° offset positions around the cable.

4. A method for determining the position of the conductor of an electrical cable being formed in an extrusion process comprising transmitting a beam of light across the cable, providing output signals representative of the position of the outer surface of the cable across a predetermined cross section in the cable and corresponding to that portion of the transmitted beam not obscured by the cable, providing energising currents through at least two inductive means positioned on opposite sides of the cable to induce at least two magnetic fields at said predetermined cross section, determining the variation in said energising currents in the inductive means brought about by a change in position of the conductor core moving from a desired location within the cable through the induced magnetic fields to provide a measure of the position of the conductor core, and determining the position of the conductor core with respect to the desired location by relating the position of the outer surface of the cable to the position of the conductor core, wherein the energising currents passed through the at least two inductive means are such that the magnetic fields thereby induced are in opposition to one another.

\* \* \* \* \*